United States Patent
Harvey

(10) Patent No.: US 10,645,872 B2
(45) Date of Patent: May 12, 2020

(54) ROTARY CUTTER WITH FULL-DISTRIBUTION CUTTING CHAMBER

(71) Applicant: Deere & Company, Moline, IL (US)

(72) Inventor: Bernardo Harvey, Monterrey (MX)

(73) Assignee: Deere & Company, Moline, IL (US)

( * ) Notice: Subject to any disclaimer, the term of this patent is extended or adjusted under 35 U.S.C. 154(b) by 546 days.

(21) Appl. No.: 15/166,108

(22) Filed: May 26, 2016

(65) Prior Publication Data
US 2017/0339826 A1 Nov. 30, 2017

(51) Int. Cl.
| A01D 34/52 | (2006.01) |
| A01D 34/66 | (2006.01) |
| A01D 34/71 | (2006.01) |
| A01D 34/81 | (2006.01) |
| A01D 101/00 | (2006.01) |

(52) U.S. Cl.
CPC ......... *A01D 34/667* (2013.01); *A01D 34/664* (2013.01); *A01D 34/71* (2013.01); *A01D 34/81* (2013.01); *A01D 2101/00* (2013.01)

(58) Field of Classification Search
CPC .. A01D 34/667; A01D 34/81; A01D 2101/00; A01D 34/71
USPC ............ 56/320.1, 320.2, 295, 17.4, DIG. 20, 56/DIG. 24
See application file for complete search history.

(56) References Cited

U.S. PATENT DOCUMENTS

| 3,469,376 A * | 9/1969 | Bacon ................................. 56/6 |
| 3,797,214 A | 3/1974 | Erdman et al. |
| 3,828,533 A * | 8/1974 | Finneran ...................... 56/320.2 |
| 6,470,663 B2 | 10/2002 | Langworthy et al. |
| 7,299,613 B2 * | 11/2007 | Samejima ............ A01D 34/005 56/320.1 |
| 7,735,306 B2 * | 6/2010 | Kure et al. .................... 56/320.1 |
| 8,959,882 B2 * | 2/2015 | Gonzalez ............... A01D 34/66 56/320.1 |
| 2009/0193779 A1 * | 8/2009 | Hofmann et al. ........... 56/320.2 |
| 2015/0013298 A1 | 1/2015 | Gaeddert et al. |

OTHER PUBLICATIONS

The Grasshopper Company, DuraMax 4X Rear Discharge Decks for MidMount Models, Product Page, Admitted Prior Art.
Kubota Canada Ltd., Kubota Lawn Tractor T1880/T2080/T2380, Product Brochure, Mar. 2014.
Land Pride, Rear Discharge Grooming Mowers FDR2572 & FDR2584, Operator's Manual, Nov. 20, 2015.

* cited by examiner

*Primary Examiner* — Thomas B Will
*Assistant Examiner* — Mai T Nguyen
(74) *Attorney, Agent, or Firm* — Tucker Ellis LLP

(57) ABSTRACT

A rotary cutting implement includes a housing that extends along a longitudinal axis. The rotary cutting implement also includes an annular wall coupled to the housing to define a cutting chamber having a width defined from a first sidewall to a second sidewall. The annular wall includes a distribution deflector having a body that extends along an axis substantially transverse to the longitudinal axis to form the second sidewall of the cutting chamber. The distribution deflector distributes cut residue over substantially the width of the cutting chamber.

17 Claims, 6 Drawing Sheets

US 10,645,872 B2

ROTARY CUTTER WITH FULL-DISTRIBUTION CUTTING CHAMBER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to implements for use in rotary cutting operations, and to implements with a full-distribution cutting chamber that evenly disperses cut residue.

BACKGROUND OF THE DISCLOSURE

Various agricultural or other operations may result in residue covering a portion of the area addressed by the operation. In an agricultural setting, for example, residue may include straw, corn stalks, or various other types of plant material, which may be loose or attached to the ground to varying degrees. In order to maintain or clear the area, a rotary cutting implement may be used to cut the residue. Many rotary cutting implements, however, are unable to discharge the cut residue uniformly, resulting in windrows that can lead to increased weed formation, an uneven inclusion of decomposed material on the field, and are generally unsightly.

SUMMARY OF THE DISCLOSURE

The disclosure provides an implement with a full-distribution cutting chamber to evenly distribute cut residue over a width of the implement.

In one aspect the disclosure provides a rotary cutting implement. The rotary cutting implement includes a housing that extends along a longitudinal axis. The rotary cutting implement also includes an annular wall coupled to the housing to define a cutting chamber having a width defined from a first sidewall to a second sidewall. The annular wall includes a distribution deflector having a body that extends along an axis substantially transverse to the longitudinal axis to form the second sidewall of the cutting chamber. The distribution deflector distributes cut residue over substantially the width of the cutting chamber.

In another aspect the disclosure provides a rotary cutting implement. The rotary cutting implement includes a housing that extends along a longitudinal axis. The rotary cutting implement also includes an annular wall coupled to the housing to define a cutting chamber having a width defined from a first sidewall to a second sidewall. The annular wall includes a sloped apron coupled to a distribution deflector. The sloped apron defines a sloped area adjacent to the distribution deflector. The distribution deflector has a body that extends along an axis substantially transverse to the longitudinal axis to form the second sidewall of the cutting chamber. The distribution deflector distributes cut residue over the width of the cutting chamber.

In yet another aspect the disclosure provides a rotary cutting implement. The rotary cutting implement includes a housing that extends along a longitudinal axis. The rotary cutting implement also includes an annular wall coupled to the housing to define a cutting chamber. The annular wall includes a sloped apron coupled to a distribution deflector and an anti-turbulence deflector. The sloped apron defines a sloped area adjacent to the distribution deflector. The distribution deflector has a first end and a second end, and a height of the distribution deflector relative to the housing at the first end is different than a height of the distribution deflector relative to the housing at the second end. The distribution deflector forms a sidewall of the cutting chamber. The anti-turbulence deflector is coupled to the housing such that the anti-turbulence deflector is spaced apart from the distribution deflector to define an opening.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
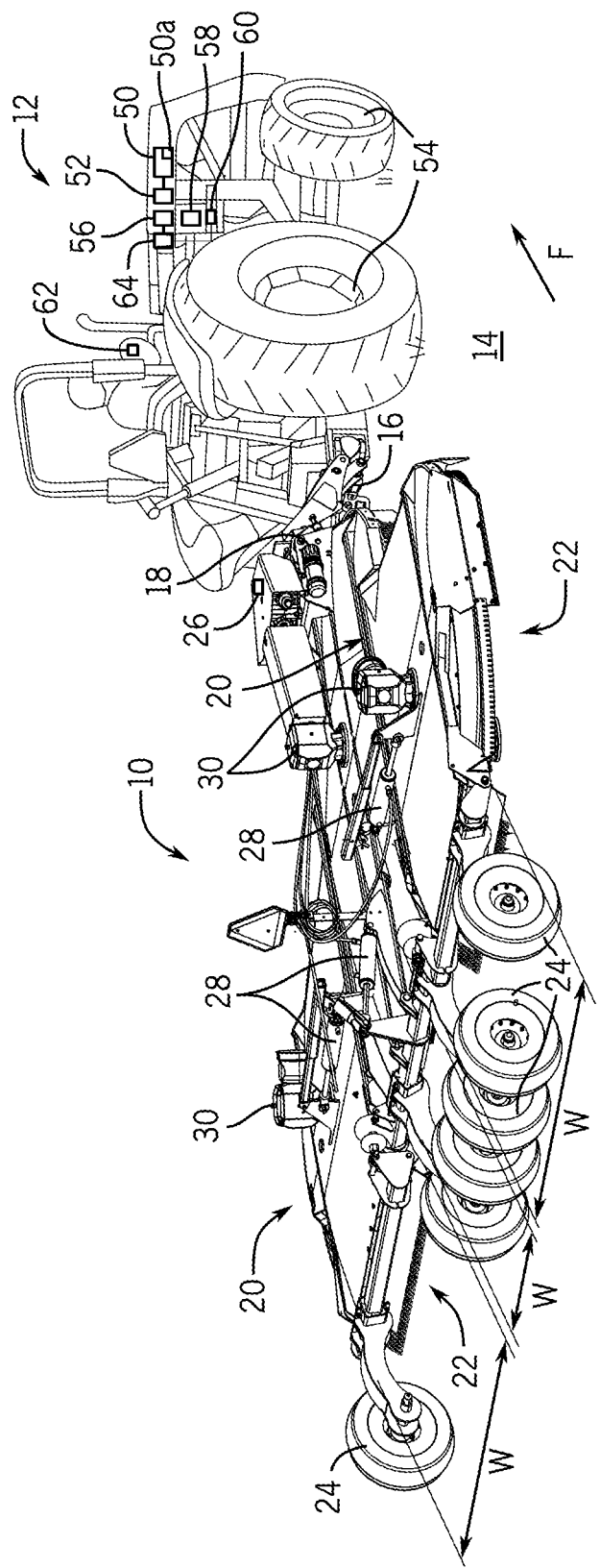
FIG. 1 is a perspective view of an example work machine in the form of a tractor towing a rotary cutting implement with a plurality of full distribution cutting chambers.

The following describes one or more example embodiments of the disclosed system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted above, various operations may result in residue on a field. Various agricultural machines (e.g., rotary cutting implements, primary and secondary tillage implements, and so on) have very wide platforms for mounting various tools for working crop fields. To allow for transport on roadways, the implements may be formed in sections, one or more of which are able to fold inward alongside or above a main fame of the implement, which has a controlled (e.g., regulated) width or lateral dimension. The sections may be hinged together and pivot with respect to one another between an operational position, in which the "wing" frame sections are generally parallel with the main frame section, and a transport position, in which the wing sections are folded up and/or over the main frame section. An implement may have as few as one main frame section and one wing section, or it may have several wing sections, such as multiple (e.g., inner and outer) wing sections on each side of the main frame section.

In the example of a rotary cutting implement, the rotary cutting implement can be towed along a field, by a work vehicle, for example, to cut residue on the field. Typically, conventional rotary cutting implements leave windrows on the field, which may promote weed growth and cause undesired plague on crop fields. The disclosed system, however, substantially eliminates windrows by discharging cut residue substantially evenly about a width of the cutting chamber, and thus, the rotary cutting implement. In this regard, the disclosed system includes an annular wall coupled to a housing that defines a cutting chamber. The cut debris is distributed evenly over the width of the cutting chamber, eliminating windrows. The annular wall includes a front distributor, a sloped apron, an intermediate portion, a distribution deflector and an anti-turbulence deflector that cooperate to define the cutting chamber. The anti-turbulence deflector is coupled to the housing so as to be offset from a longitudinal axis of the housing, which prevents turbulence from entering the cutting chamber.

The front deflector is coupled to the housing so as to extend along a front of the cutting chamber in a towing direction of the rotary cutting implement. A portion of the front deflector is coupled about the sloped apron, to assist in guiding cut material to the sloped apron. The sloped apron comprises a sloped area that extends from a surface of the housing and forms a sidewall of the cutting chamber. The slope of the sloped apron causes a breaking wave effect on the cut material, which causes the cut material to lose inertia. As the cut material loses inertia, the cut material flows along the distribution deflector, which is coupled to the sloped apron. The distribution deflector is coupled to the housing so as to be positioned at an angle relative to the housing, thereby defining a slope. The distribution deflector also defines a sidewall of the cutting chamber. The distribution deflector guides the cut material from the sloped apron towards an opening defined at a rear of the cutting chamber. The distribution deflector also has a gradually decreasing height, with the height being less at the opening than at an end of the distribution deflector coupled to the sloped apron. The height difference enables some of the cut residue to exit the cutting chamber prior to the opening, which results in a substantially even distribution of the cut material.

As noted above, the system described herein may be employed with respect to a variety of implements, including various agricultural or other work implements. In certain embodiments, the described system may be implemented with respect to a rotary cutting implement. It will be understood, however, that the system disclosed herein may be used with various other work implements, such as a residential riding mower. Referring to FIG. 1, in some embodiments, the disclosed system is used with a rotary cutter implement 10, which is towed by a work vehicle 12, such as a tractor. It will be understood that the configuration of the rotary cutter implement 10 coupled to the work vehicle 12 is presented as an example only. Moreover, the depicted embodiment illustrates the work vehicle 12 as a tractor. It should be understood that the work vehicle 12 may comprise any suitable vehicle for towing the rotary cutter implement 10, and thus, the use of the tractor is merely an example.

In the embodiment depicted, rotary cutter implement 10 includes a coupling mechanism 16 for coupling the rotary cutter implement 10 to the work vehicle 12. This allows the rotary cutter implement 10 to be towed across a field 14 in a forward direction F in order to execute a cutting operation. It will be understood that other embodiments may include self-driven implements that may execute various operations without being towed by a separate work vehicle.

The rotary cutter implement 10 includes a main frame 18, which is coupled to the coupling mechanism 16 and generally extends in an aft direction away from the coupling mechanism 16. In this example, the rotary cutter implement 10 is a multi-section implement with the main frame 18 coupled at each side to folding wing sections 20. Each of the main frame 18 and the folding wing sections 20 include a full-distribution cutting chamber 22. As used herein, a full-distribution cutting chamber is a cutting chamber that distributes cut residue along a width of the cutting chamber, substantially evenly, such that no windrows, piles or clumps of cut debris are formed during the operation of the rotary cutter implement 10. It will be understood that while the rotary cutter implement 10 is described and illustrated herein as a multi-section implement, the rotary cutter implement 10 may include a single frame section with a single full-distribution cutting chamber 22, if desired. In certain embodiments a plurality of wheel assemblies 24 may also be coupled to the main frame 18 and/or the folding wing sections 20, in order to support the main frame 18 and/or the folding wing sections 20 above the field 14. The folding wing sections 20 can be movably coupled on either side of the main frame 18 via one or more hinges.

The rotary cutter implement 10 includes (or may be in communication with) one or more controllers, which may include various electrical, computerized, electro-hydraulic, or other controllers. In certain embodiments, for example, an electrohydraulic controller 26 is mounted to the coupling mechanism 16. The controller 26 may include various processors (not shown) coupled with various memory architectures (not shown), as well as one or more electrohydraulic valves (not shown) to control the flow of hydraulic control signals to various devices included on the rotary cutter implement 10. In certain embodiments, the controller 26 may be in communication with a CAN bus associated with the rotary cutter implement 10 or the work vehicle 12.

In certain embodiments, one or more hydraulic cylinders 28 (or other lift devices) may be coupled to the folding wing sections 20 and the wheel assemblies 24. The hydraulic cylinders 28 may be in hydraulic (or other) communication with the controller 26, such that the controller 26 outputs one or more control signals to the hydraulic cylinders 28 to raise or lower the folding wing sections 20 relative to the main frame 18 to fold or unfold the rotary cutter implement 10. The hydraulic cylinder 28 associated with the wheel assemblies 24 is in communication with the controller 26 to receive one or more control signals in order to move the main frame 18 to various orientations relative to the field 14. It will be understood that other configurations may also be possible. For example, in certain embodiments, the hydraulic cylinders 28 (or another lift device) may be coupled directly to the main frame 18 (or associated support components) rather than the wheel assemblies 24, in order to directly move the main frame 18 relative to the field 14. With brief reference to FIG. 3, the hydraulic cylinders 28 can be coupled to the folding wing sections 20 via a bracket 29.

Figure 2:
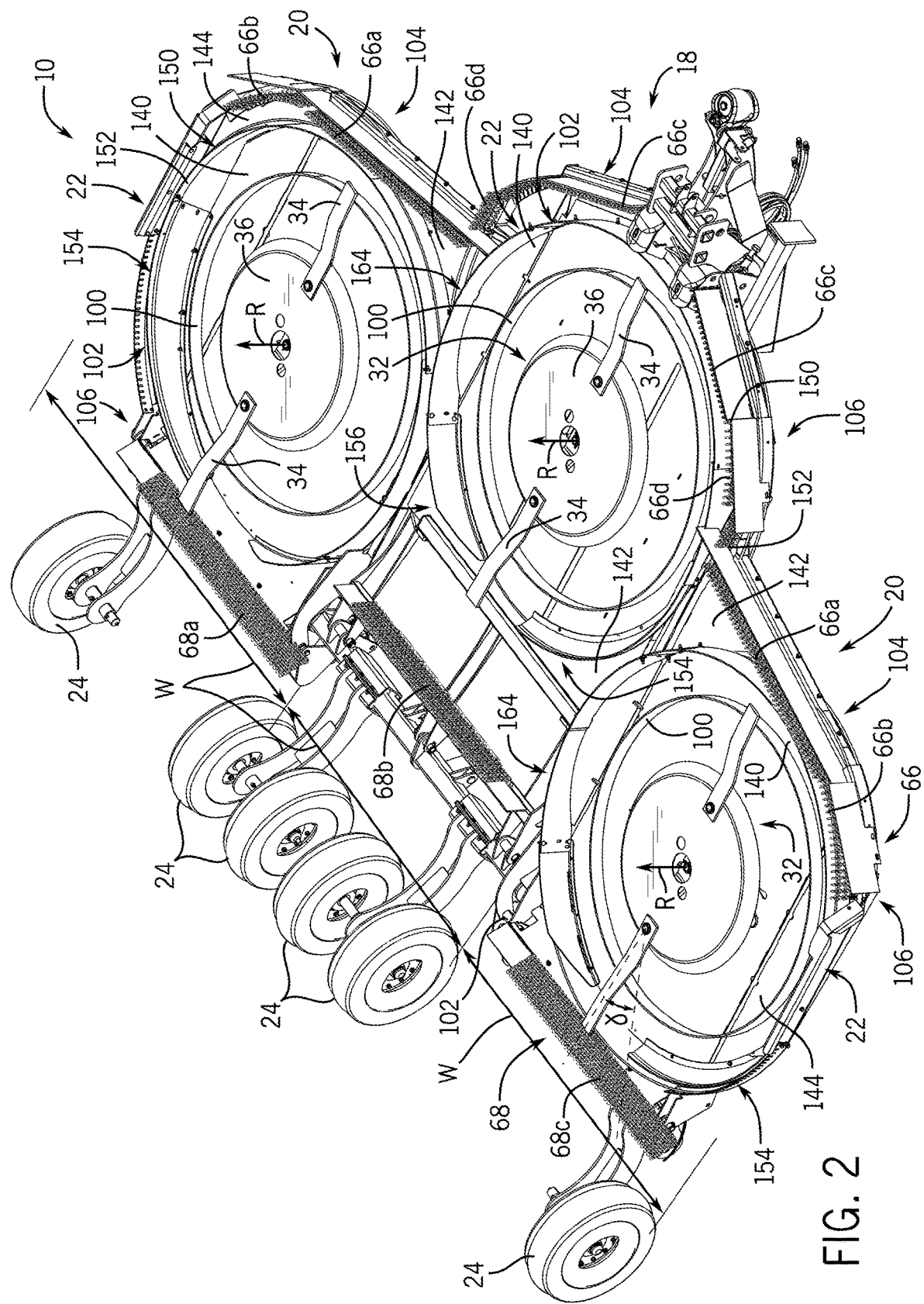
FIG. 2 is a rear view of the rotary cutting implement of FIG. 1.

Various other control devices and systems may be included on or otherwise associated with the rotary cutter implement 10. For example, with reference to FIG. 1, one or more hydraulic motors 30 can be associated with each one of the full-distribution cutting chambers 22 to drive a respective cutting blade assembly 32 (FIG. 2). Each of the motors 30 are in communication with the controller 26 to receive one or more control signals to drive the motors 30, and thus, the cutting blade assembly 32. In one example, with reference to FIG. 2, the cutting blade assembly 32 includes two blades 34, which are coupled to a pan 36. The blades 34 comprise any suitable cutting implement, and generally include a sharpened end for cutting the residue. The pan 36 is coupled to an output shaft of the respective motor 30, such that the rotation of the output shaft rotates the pan 36. The rotation of the pan 36 in turn rotates the blades 34, which cut the residue. The rotation of the blades 34 also generates a negative pressure or suction, which draws the cut residue up into the full-distribution cutting chamber 22. This assists in pulling residue into the full-distribution cutting chamber 22 to be cut by the cutting blade assembly 32. With reference back to FIG. 1, the shape of the full-distribution cutting chamber 22 ensures the cut residue is distributed evenly about a width W of the respective full-distribution cutting chamber 22, and thus, substantially evenly about a width of the rotary cutter implement 10. This reduces and substantially eliminates the formation of windrows as the rotary cutter implement 10 is moved along the field F.

The work vehicle 12 includes a source of propulsion, such as an engine 50. The engine 50 supplies power to a transmission 52. The transmission 52 transfers the power from the engine 50 to a suitable driveline coupled to one or more driven wheels 54 (and tires) of the work vehicle 12 to enable the work vehicle 12 to move. In one example, the engine 50 is an internal combustion engine, such as a diesel engine, that is controlled by an engine control module 50a. It should be noted that the use of an internal combustion engine is merely exemplary, as the propulsion device can be a fuel cell, electric motor, a hybrid-electric motor, etc.

The work vehicle 12 also includes one or more pumps 56, which may be driven by the engine 50 of the work vehicle 12. Flow from the pumps 56 may be routed through various control valves 58 and various conduits (e.g., flexible hoses) to the controller 26 in order to drive the hydraulic cylinders 28 and hydraulic motors 30. Flow from the pumps 56 may also power various other components of the work vehicle 12. The flow from the pumps 56 may be controlled in various ways (e.g., through control of the various control valves 58 and/or the controller 26), in order to cause movement of the hydraulic cylinders 28 and the hydraulic motors 30, and thus, the folding wing sections 20 and cutting blade assembly 32 of the rotary cutter implement 10. In this way, for example, a movement of a portion of the rotary cutter implement 10 may be implemented by various control signals to the pumps 56, control valves 58, controller 26 and so on.

Generally, a controller 60 (or multiple controllers) may be provided, for control of various aspects of the operation of the work vehicle 12, in general. The controller 60 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 60 may be configured to execute various computational and control functionality with respect to the work vehicle 12 (or other machinery). In some embodiments, the controller 60 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 60 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 60 may be in electronic, hydraulic, mechanical, or other communication with various other systems or devices of the work vehicle 12 (or other machinery, such as the rotary cutter implement 10). For example, the controller 60 may be in electronic or hydraulic communication with various actuators, sensors, and other devices within (or outside of) the work vehicle 12, including various devices associated with the pumps 56, control valves 58, controller 26, and so on. The controller 60 may communicate with other systems or devices (including other controllers, such as the controller 26) in various known ways, including via a CAN bus (not shown) of the work vehicle 12, via wireless or hydraulic communication means, or otherwise.

In some embodiments, the controller 60 may be configured to receive input commands and to interface with an operator via the human-machine interface 62, which may be disposed on a portion of the work vehicle 12 for easy access by the operator. The human-machine interface 62 may be configured in a variety of ways. In some embodiments, the human-machine interface 62 may include one or more joysticks, various switches or levers, one or more buttons, a touchscreen interface that may be overlaid on a display, a keyboard, a speaker, a microphone associated with a speech recognition system, or various other human-machine interface devices.

Various sensors may also be provided to observe various conditions associated with the work vehicle 12 and/or the rotary cutter implement 10. In some embodiments, various sensors 64 (e.g., pressure, flow or other sensors) may be disposed near the pumps 56 and control valves 58, or elsewhere on the work vehicle 12. For example, sensors 64 may comprise one or more pressure sensors that observe a pressure within the hydraulic circuit, such as a pressure associated with at least one of the one or more hydraulic cylinders 28. The sensors 64 may also observe a pressure associated with the pumps 56.

The various components noted above (or others) may be utilized to control the rotary cutter implement 10 via control of the movement of the one or more hydraulic cylinders 28 and motors 30, and thus, the cutting blade assembly 32. Accordingly, these components may be viewed as forming part of the rotary cutter control system for the work vehicle 12 and/or rotary cutter implement 10.

With reference to FIG. 2, the rotary cutter implement 10 is shown in more detail. As discussed, the rotary cutter implement 10 includes three full-distribution cutting chambers 22, each coupled to a respective one of the main frame 18 and the folding wing sections 20. The rotary cutter implement 10 also includes one or more forward cutting guards 66 and one or more rear cutting guards 68. As each of the full-distribution cutting chambers 22 are substantially similar or the same, a single one of the full-distribution cutting chambers 22 will be discussed in detail herein and the same reference numerals will be used to denote the same or similar components. Generally, the full-distribution cutting chambers 22 associated with the folding wing sections 20 are mirror images of each other.

Figure 3:
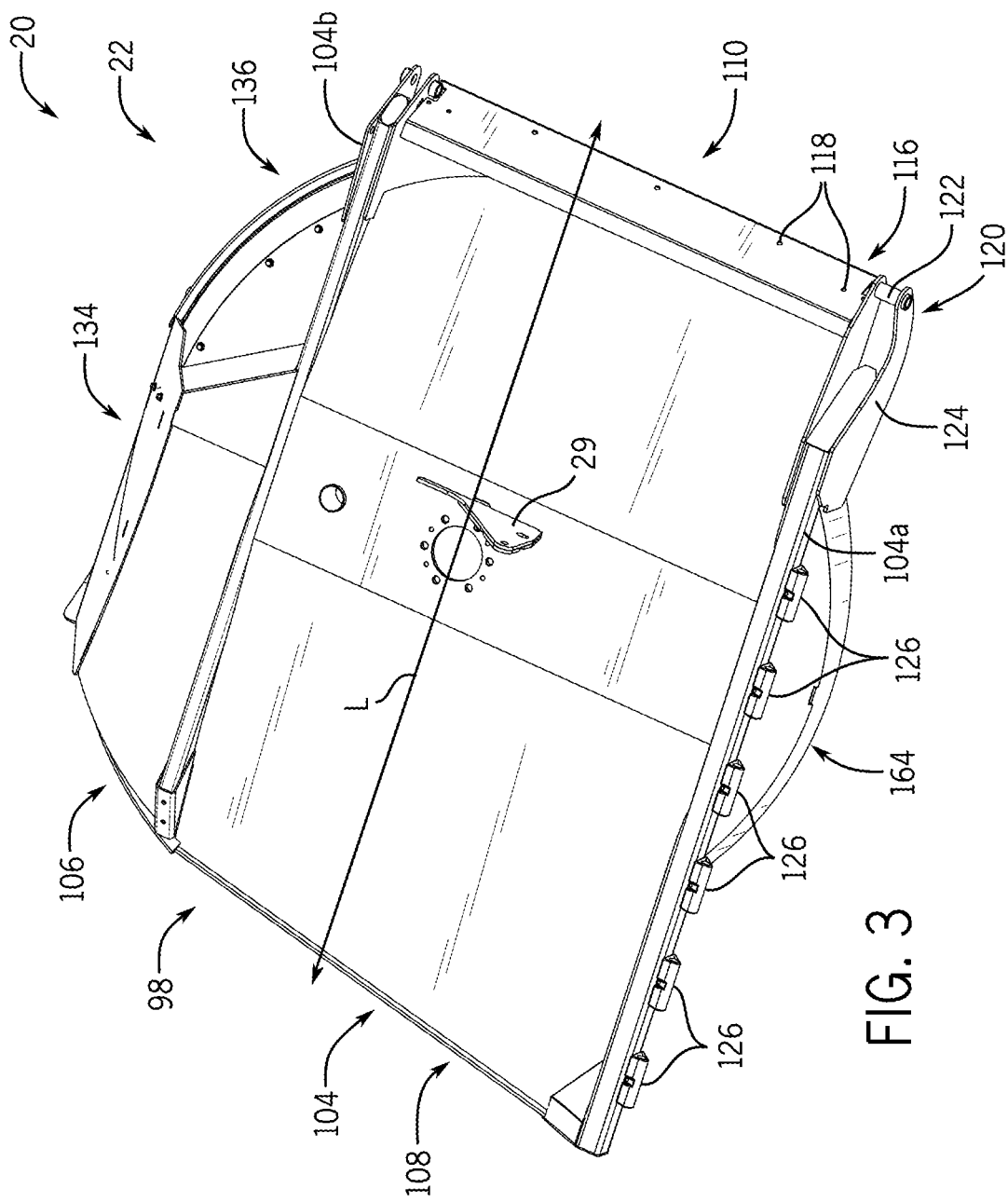
FIG. 3 is a top perspective view of a folding wing section, which includes one of the full-distribution cutting chambers.
Figure 4:
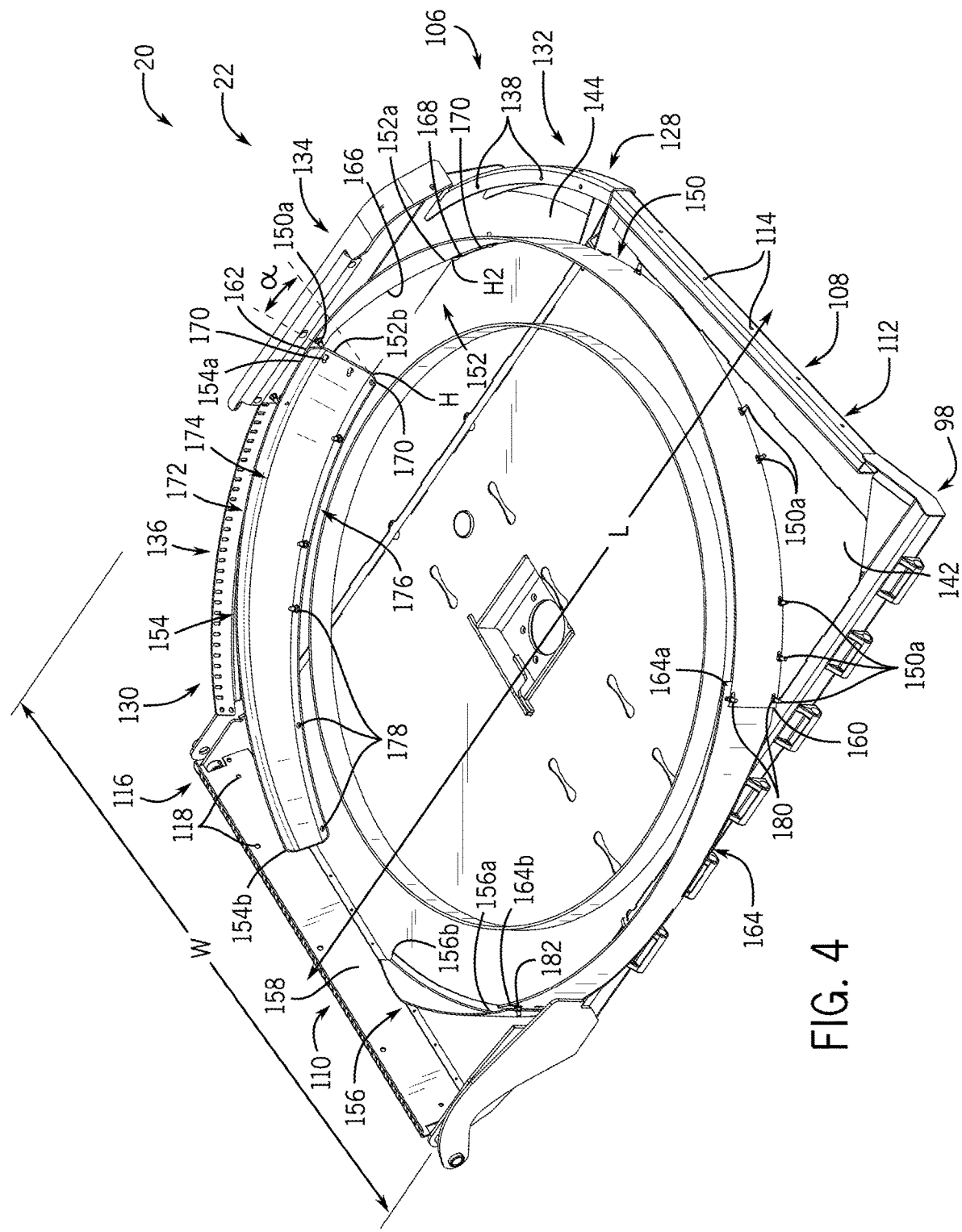
FIG. 4 is a rear perspective view of the folding wing section of FIG. 3.

The full-distribution cutting chamber 22 includes a housing 98, a first annular wall portion 100 and a second annular wall portion 102. The housing 98 is coupled to the respective one of the main frame 18 and the folding wing sections 20. With reference to FIGS. 3 and 4, the housing 98 includes a first housing section 104 and a second housing section 106. Each of the first housing section 104 and the second housing section 106 are composed of a metal or metal alloy, and can be stamped, machined, or otherwise formed. The first housing section 104 is coupled to the second housing section 106 through a suitable technique, such as welding, mechanical fasteners, and so on. Optionally, the first housing section 104 and the second housing section 106 are formed as a single piece, through stamping, for example.

The first housing section 104 is substantially planar, and includes a first end 108 and a second end 110. With reference to FIG. 4, the first end 108 includes a flange 112, which couples the forward cutting guards 66 to the first end 108. In this example, the flange 112 defines one or more bores 114. The bores 114 receive one or more mechanical fasteners, such as screws, to couple a respective forward cutting guard 66 to the first end 108 (FIG. 2). It should be understood, however, that the respective forward cutting guard 66 can be coupled to the first end 108 via any suitable technique, such as rivets, welding, etc.

The second end 110 includes a ramped or sloped portion 116, which also defines a plurality of bores 118. The sloped portion 116 generally has a negative slope relative to a longitudinal axis L of the full-distribution cutting chamber 22. For example, the sloped portion 116 can extend along an axis, which is angled about negative 15 degrees to about negative 30 degrees relative to the longitudinal axis L. The sloped portion 116 cooperates with the full-distribution cutting chamber 22 to direct the residue toward a ground surface of the field 14 (FIG. 1). The plurality of bores 118 of the sloped portion 116 receive one or more mechanical fasteners, such as screws, to couple a respective rear cutting guard 68 to the second end 110 (FIG. 2). The second end 110 can also include a wheel linkage 120. The wheel linkage 120 includes a rod 122 and a support bracket 124. The rod 122 is coupled to the second end 110, and extends outwardly from the second end 110 toward the support bracket 124, in a direction substantially transverse to the longitudinal axis L. The support bracket 124 may be curved to facilitate the coupling of a wheel assembly 24 (FIG. 1) to the first housing section 104. The support bracket 124 couples the rod 122 to the first housing section 104 near the second end 110 and provides additional structural reinforcement to the rod 122.

In the example of the full-distribution cutting chamber 22 coupled to one of the folding wing sections 20, the first housing section 104 also includes a plurality of hinge portions 126 defined along a side 104a of the first housing section 104 from the first end 108 to near the second end 110. The plurality of hinge portions 126 cooperate with a respective plurality of hinge portions defined on the main frame 18 to rotatably couple the folding wing section 20 to the main frame 18.

The second housing section 106 is coupled to the first housing section 104 on a side 104b opposite the plurality of hinge portions 126. The second housing section 106 is generally curved at a first end 128 and a second end 130. The second housing section 106 includes a first flange 132, a second flange 134 and a third flange 136. Generally, the first flange 132, the second flange 134 and the third flange 136 are composed of a metal or metal alloy, such as stainless steel, which is stamped, cast, machined, etc. into the desired shape. The first flange 132 is arcuate, and is coupled to the first end 128 of the second housing section 106. The first flange 132 defines a plurality of bores 138. The plurality of bores 138 receive one or more mechanical fasteners, such as screws, to couple a respective forward cutting guard 66 to the first end 128 (FIG. 2). The second flange 134 is substantially planar, and defines a portion of the second annular wall portion 102. The second flange 134 is coupled between the first flange 132 and the third flange 136. The third flange 136 is arcuate and is coupled to the second end 130 of the second housing section 106. The third flange 136 acts as a cutting guard along the side 104b of the first housing section 104. It should be noted that the full-distribution cutting chamber 22 associated with the main frame 18 may not include the second flange 134 or the third flange 136 to enable the coupling of the folding wing sections 20 to the main frame 18, as shown in FIG. 2.

With reference to FIG. 2, the first annular wall portion 100 and the second annular wall portion 102 are each coupled to the first housing section 104 and the second housing section 106. The first annular wall portion 100 is substantially continuous, and surrounds the cutting blade assembly 32. The first annular wall portion 100 is positioned within the second annular wall portion 102, and cooperates with the second annular wall portion 102 to define a channel 140. The first annular wall portion 100 is substantially coaxial with an axis of rotation R of the cutting blade assembly 32. The first annular wall portion 100 is generally composed of a metal or metal alloy, and is coupled to a surface 142 of the first housing section 104 and a surface 144 of the second housing section 106. In one example, the first annular wall portion 100 is coupled to the surface 142 and the surface 144 via one or more mechanical fasteners, however, any suitable technique can be used, such as welding, etc.

The second annular wall portion 102 is spaced apart from the first annular wall portion 100 and generally defines a periphery of the full-distribution cutting chamber 22. Stated another way, the second annular wall portion 102 generally defines the full-distribution cutting chamber 22. The second annular wall portion 102 includes a front deflector 150, a sloped apron 152, a distribution deflector 154 and a rear anti-turbulence deflector 156. The front deflector 150, the sloped apron 152, the distribution deflector 154 and the rear anti-turbulence deflector 156 cooperate to define an opening 158. As will be discussed, the opening 158 cooperates with the distribution deflector 154 to distribute the cut residue evenly along a width W of the full-distribution cutting chamber 22.

With reference to FIG. 4, the front deflector 150 includes a first end 160 and a second end 162. The front deflector 150 is curved from the first end 160 to the second end 162. The first end 160 is coupled to an intermediate portion 164, which couples the front deflector 150 to the rear anti-turbulence deflector 156. The second end 162 is coupled to the sloped apron 152. The front deflector 150 also includes a cut-out portion 166, defined from a point 168 near the second end 162 to the second end 162. The cut-out portion 166 is defined through the thickness of the front deflector 150 to enable the front deflector 150 to be positioned about a portion of the sloped apron 152. The front deflector 150 generally extends along the first end 108 of the first housing section 104 and the first end 128 of the second housing section 106 to enclose suctioned air generated by the rotation of the cutting blade assembly 32 and to prevent the discharge of residue from the first end 108 and/or first end 128 of the housing 98. The front deflector 150 also serves as a guide to direct cut residue towards the distribution deflector 154 and the rear anti-turbulence deflector 156. Generally, the front deflector 150 is composed of a flexible material, which is capable of withstanding impact, such as impact from rocks, etc. In one example, the front deflector 150 is composed of a polymeric material, including, but not limited to, natural or synthetic rubber, which can be molded or cut into the shape desired for the front deflector 150. The front deflector 150 can also be molded or post-processed to define a plurality of bores 150*a*. The plurality of bores 150*a* receive a respective one of a plurality of fasteners to couple the front deflector 150 to the first housing section 104, the second housing section 106, the sloped apron 152 and the intermediate portion 164.

In certain instances, a fastening rail 171 is coupled to the first housing section 104 and the second housing section 106 to assist in coupling the front deflector 150 to the housing 98. The fastening rail 171 generally has a shape that corresponds to the shape of the front deflector 150, and is composed of a metal or metal alloy. The fastening rail 171 can be welded to the housing 98, and/or can be coupled to the housing 98 via one or more mechanical fasteners, such as bolts, screws, rivets, etc. The fastening rail 171 extends upward from the surface 142 and the surface 144 so as to extend along an axis substantially perpendicular to the longitudinal axis L of the full-distribution cutting chamber 22. The fastening rail 171 defines one or more bores 171*a*, which cooperate to receive a respective one of the mechanical fasteners to couple the front deflector 150 to the housing 98. It should be noted, however, that one or more flanges can be defined in the surface 142 and the surface 144 to define the bores 171*a* to couple the front deflector 150 to the housing 98.

The sloped apron 152 is defined by the second flange 134 and is adjacent to the surface 144 of the second housing section 106. Generally, the sloped apron 152 is a sloped area defined adjacent to the distribution deflector 154. The slope defined by the sloped apron 152 extends from a first end 152*a* to a second end 152*b*. The second end 152*b* has a height H, which is different or greater than a height H2 of the first end 152*a*. The sloped apron 152 is substantially triangular in shape, and is angled relative to the surface 144 by an angle α between about 30 degrees and about 40 degrees relative to the surface 144. Generally, as the surface 144 is flat or planar, the incline or slope of the sloped apron 152 creates a breaking wave effect, which breaks the compact residue flow into turbulent flow. In this regard, as residue is cut, it has a tendency to flow upward, towards the surface 142 and surface 144, where the cut residue is compressed by the airflow generated by the cutting blade assembly 32 and compacted. The incline of the sloped apron 152 creates a breaking wave effect on the compacted residue flow, which results in a turbulent flow of cut residue that separates and breaks apart the cut residue, thereby allowing for an even distribution of the cut residue over the width W of the full-distribution cutting chamber 22. In this example, the sloped apron 152 is coupled to the distribution deflector 154 such that a first end 154*a* of the distribution deflector 154 overlaps a portion of the second end 152*b* of the sloped apron 152. It should be noted, however, that the first end 154*a* can abut the second end 152*b*, if desired, and that other configurations are possible. In this example, the second end 152*b* defines one or more bores (not shown), which can each be substantially coaxial with a plurality of bores 170 defined through the first end 154*a*. The one or more bores of the second end 152*b* and the plurality of bores 170 of the first end 154*a* receive a respective mechanical fastener therethrough to couple the sloped apron 152 to the distribution deflector 154. It should be noted, that the sloped apron 152 can be coupled to the distribution deflector 154 and/or the second housing section 106 via any suitable technique, such as welding, riveting, etc.

Figure 5:
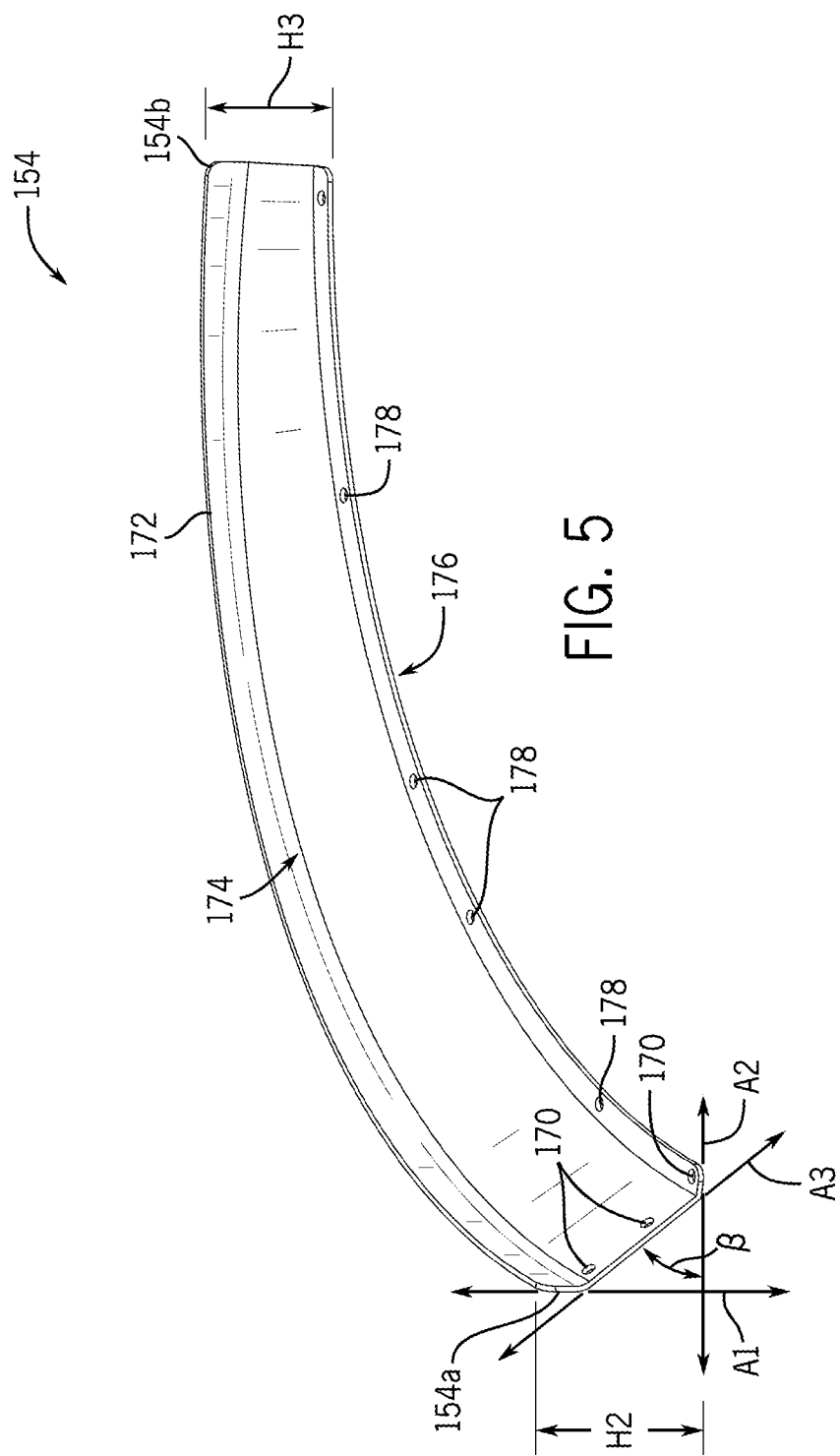
FIG. 5 is a perspective view of a distribution deflector for use with the full-distribution cutting chamber.

The distribution deflector 154 is coupled to the sloped apron 152 and extends from the sloped apron 152 to the second end 110. The distribution deflector 154 has a curved or arcuate shape from the first end 154*a* to a second end 154*b*. With reference to FIG. 5, the distribution deflector 154 is shown in greater detail. The distribution deflector 154 includes a deflector lip 172, a body 174 and a coupling flange 176. Generally, the distribution deflector 154 comprises a one-piece or monolithic part, which is composed of a metal or metal alloy, such as steel. The distribution deflector 154 can be stamped, machined, cast, etc.

The deflector lip 172 guides or directs the turbulent cut residue toward the second end 110 of the housing 98. The deflector lip 172 is coupled to the body 174 and extends outwardly from the body 174. In one example, the deflector lip 172 extends along an axis A1, which is substantially transverse to, and for example, substantially perpendicular to an axis A2. The axis A2 generally extends along the surface 144, such that the deflector lip 172 extends substantially transverse to the surface 144 (FIG. 4).

The body 174 is defined between and coupled to the deflector lip 172 and the coupling flange 176. The body 174 extends along an axis A3 that is transverse to the axis A2, such that the body 174 is sloped or inclined relative to the surface 144. Stated another way, the body 174 extends at an angle β relative to the surface 144. In one example, the angle β is about 30 to about 40 degrees. Generally, the body 174 tapers from the first end 154*a* to the second end 154*b*, such that the body 174 has a height H2 at the first end 154*a*, which is different than a height H3 of the body 174 at the second end 154*b*. In one example, the height H2 is about 150 millimeters (mm) and the height H3 is about 50 millimeters (mm). It should be noted that these heights H2, H3 are merely exemplary. The difference in heights H2, H3 of the body 174 cooperates with the slope of the body 174 relative to the surface 144 to enable a gradual discharge of the cut residue over the deflector lip 172, which provides for the even distribution of the cut residue from the full-distribution cutting chamber 22. The body 174 also defines one or more of the plurality of bores 170 at the first end 154*a*, which receive the plurality of fasteners to couple the distribution deflector 154 to the sloped apron 152.

The coupling flange 176 extends along the axis A2, and is substantially parallel with the surface 144. With reference to FIG. 4, the coupling flange 176 couples the distribution deflector 154 to the surface 144. In one example, the coupling flange 176 includes one of the plurality of bores 170 at the first end 154*a*, and also defines a plurality of bores 178 from the first end 154*a* to the second end 154*b*. The plurality of bores 178 receive a respective one of a plurality of fasteners to couple the distribution deflector 154 to the surface 144.

The body 174 of the distribution deflector 154 also provides eccentricity to a cutting chamber radius defined by the full-distribution cutting chamber 22. In this regard, with reference to FIG. 6, a cutting chamber radius $CR_1$ defined by the intermediate portion 164 is different than, and in one example, greater than, a cutting chamber radius $CR_2$ along a portion of the annular wall defined by the distribution deflector 154. Thus, the cutting radius defined by the second annular wall portion 102 is generally eccentric. This eccentricity enables the cut residue to lose inertia created by the suction caused by the cutting blade assembly 32, which causes the cut residue to slide down the body 174 of the distribution deflector 154. Further, in the example illustrated in FIG. 6, the effective radius changes not only with the slope of the body 174 of the distribution deflector 154 but also depending on the rotational angle, gradually increasing in the cutting direction toward the opening 158 at a given elevation along the slope of the body 174. The width W of the full-distribution cutting chamber 22 can be defined as the sum of CR$_1$ and CR$_2$, or the width W as measured from the intermediate portion 164 (i.e. first sidewall) to the distribution deflector 154 (i.e. second sidewall). It should be noted that a "full width" of the full-distribution cutting chamber 22 is the width W.

The intermediate portion 164 is substantially opposite a portion of the distribution deflector 154. The intermediate portion 164 couples the front deflector 150 to the rear anti-turbulence deflector 156. With reference to FIG. 4, the intermediate portion 164 is curved or arcuate from a first end 164a to a second end 164b. The first end 164a is coupled to the first end 160 of the front deflector 150, via one or more mechanical fasteners received in one or more bores 180 defined through the first end 164a, for example. The second end 164b is coupled to a first end 156a of the rear anti-turbulence deflector 156, via one or more mechanical fasteners received in one or more bores 182 defined through the first end 164a, for example. The intermediate portion 164 is generally composed of a metal or metal alloy, such as steel, which is stamped, machined or cast.

The rear anti-turbulence deflector 156 is coupled to the intermediate portion 164 at the first end 156a, and is spaced apart from the second end 154b of the distribution deflector 154 at the second end 156b to define the opening 158. The rear anti-turbulence deflector 156 can also be coupled to the surface 142, via welding, for example. Generally, the rear anti-turbulence deflector 156 extends substantially transverse, and in one example, substantially perpendicular to the surface 142. Stated another way, the rear anti-turbulence deflector 156 extends along an axis substantially transverse, and in one example, substantially perpendicular, to the longitudinal axis L. The rear anti-turbulence deflector 156 is curved or arcuate from the first end 156a to the second end 156b. The first end 156a includes a plurality of bores 184, which are substantially coaxial with the plurality of bores 182 of the second end 164b of the intermediate portion 164 to receive the one or more mechanical fasteners. It should be noted that the rear anti-turbulence deflector 156 can be coupled to the intermediate portion 164 via any suitable technique, such as welding, etc. and moreover, the rear anti-turbulence deflector 156 can be integrally formed with the intermediate portion 164, if desired. The rear anti-turbulence deflector 156 is spaced apart from the distribution deflector 154 to provide the opening 158 through which a portion of the cut residue may pass. The rear anti-turbulence deflector 156 is also spaced apart from the distribution deflector 154 to prevent or inhibit air to be drawn into the full-distribution cutting chamber 22 by the motion of the cutting blade assembly 32. Generally, with reference to FIG. 2, the rear anti-turbulence deflector 156 is positioned so as to be an angle γ offset from a perpendicular position of the cutting blade assembly 32. In one example, the angle γ is about 15 degrees.

The one or more forward cutting guards 66 are coupled about the first end 108 of the respective full-distribution cutting chamber 22. In one example, each of the full-distribution cutting chambers 22 associated with the folding wing sections 20 includes two forward cutting guards 66a, 66b. The forward cutting guard 66a is coupled to the first housing section 104, while the forward cutting guard 66b is coupled to the second housing section 106. Generally, the forward cutting guard 66b is curved to follow the contour of the second housing section 106. In the example of the full-distribution cutting chamber 22 associated with the main frame 18, this full-distribution cutting chamber 22 can include four forward cutting guards 66, two forward cutting guards 66c and two forward cutting guards 66d. The forward cutting guards 66c are generally opposite each other, and are coupled to the first housing section 104. The forward cutting guards 66d are generally opposite each other, and are coupled to the second housing section 106. The forward cutting guards 66d are curved to follow the contour of the second housing section 106. In this example, the forward cutting guards 66 comprise chain links; however, the forward cutting guards 66 can comprise any suitable barrier or guard.

The one or more rear cutting guards 68 are coupled about the second end 110 of the respective full-distribution cutting chamber 22. In one example, each of the full-distribution cutting chambers 22 includes a rear cutting guards 68a, 68b, 68c. Generally, the rear cutting guards 68 extend along the sloped portion 116 of the second end 110. In the example of the full-distribution cutting chamber 22 associated with the main frame 18, the rear cutting guard 68b extends along a ramped portion spaced apart from the full-distribution cutting chamber 22. In this example, the rear cutting guards 68 comprise chain links, however, the rear cutting guards 68 can comprise any suitable barrier or guard.

In order to assemble the rotary cutter implement 10, the full-distribution cutting chambers 22 can be assembled and coupled to the main frame 18 and the respective ones of the folding wing sections 20. In one example, with the first housing section 104 and the second housing section 106 formed and coupled together, via mechanical fasteners, for example, the first annular wall 100 is coupled to the surface 142 and the surface 144. With the first annular wall 100 coupled to the housing 98, the front deflector 150 is coupled to the surface 142 and the surface 144 via the fastening rail 171. The intermediate portion 164 is coupled to the front deflector 150, and the rear anti-turbulence deflector 156. The rear anti-turbulence deflector 156 is coupled to the surface 144. The sloped apron 152 is coupled to the front deflector 150 and the distribution deflector 154. The distribution deflector 154 is coupled to the surface 142 and the surface 144 via the coupling flange 176. With the second annular wall portion 102 coupled to the housing 98, the forward cutting guards 66 and the rear cutting guards 68 are coupled to the housing 98. Each of the folding wing sections 20 are then coupled to the main frame 18 via the hinge portions 126. The hydraulic cylinders 28 are coupled to the respective ones of the brackets 29, and the hydraulic cylinders 28 are coupled to the hydraulic circuit. The hydraulic motors 30 are coupled to the housing 98, via one or more mechanical fasteners, such as bolts. Each of the cutting blade assemblies 32 can be coupled to an output shaft of the respective hydraulic motors 30, and the hydraulic motors 30 can each be coupled to the hydraulic circuit. The wheel assemblies 24 can also be coupled to the main frame 18 and/or folding wing sections 20.

With the rotary cutter implement 10 assembled, the rotary cutter implement 10 can be coupled to the work vehicle 12 via the coupling mechanism 16. In operation, an operator of the work vehicle 12 can input a cutting command via the human-machine interface 62, which can be received by the controller 60. The controller 60 can process the received input command, and communicate with the electrohydraulic controller 26 to output one or more control signals to drive the hydraulic motors 30, thereby rotating the cutting blade assemblies 32 to cut residue.

Figure 6:
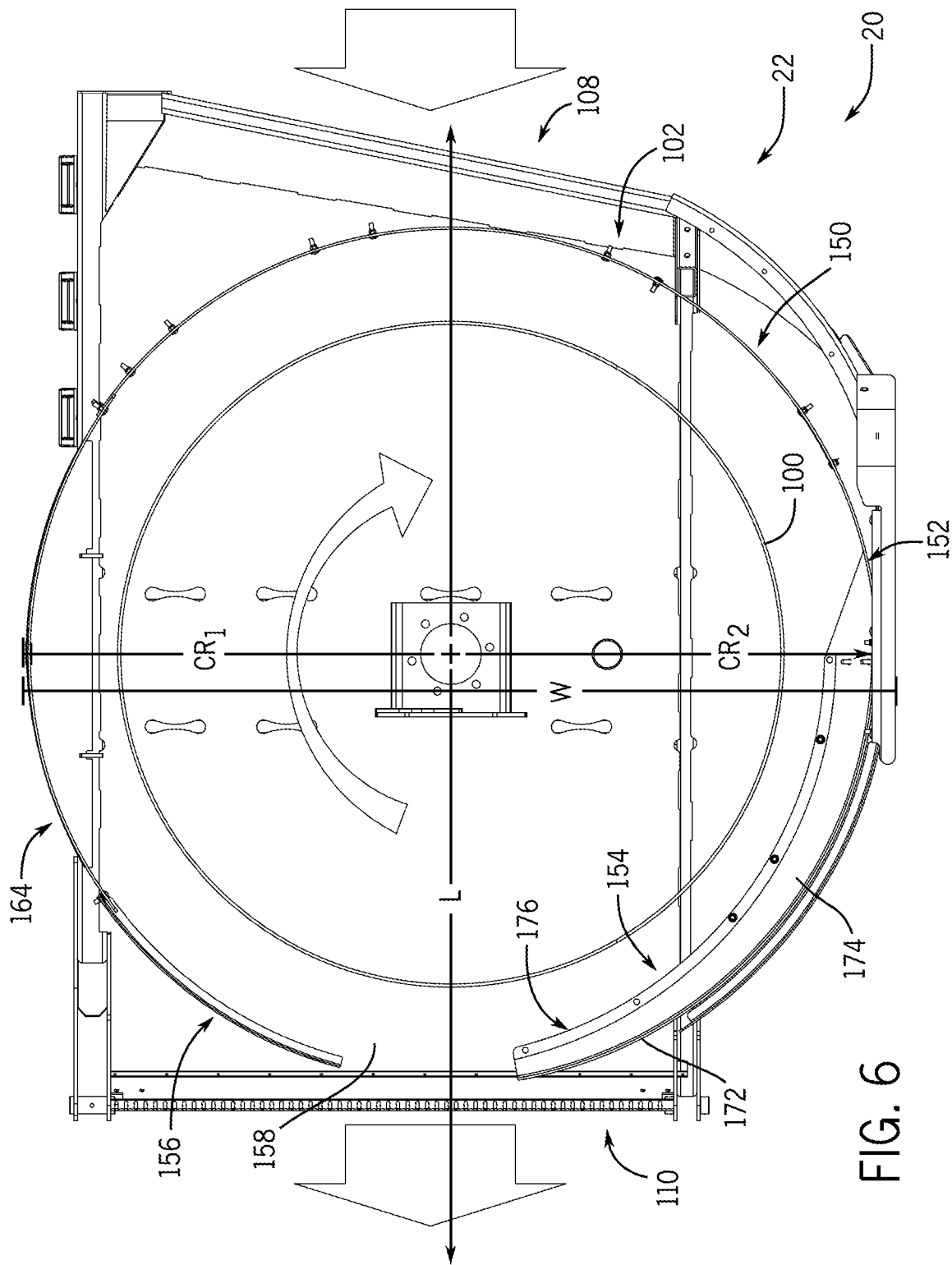
FIG. 6 is a schematic rear view of the folding wing section of FIG. 3.

With reference to FIG. 6, as the residue is cut by the cutting blade assemblies 32, the residue is drawn upward towards the surface 142 and the surface 144 by the suction created by the rotation of the cutting blades 34. The front deflector 150 prevents the flow of the residue out of the full-distribution cutting chamber 22 towards the first end 108, and constrains the cut residue into a turning flow at a top outmost radial distance of the second annular wall portion 102, or constrains the cut residue along the fastening rail 171 where the front deflector 150 is coupled to the surface 142 and the surface 144.

The cut residue is carried by the turning airflow into the sloped apron 152, which breaks the flow of the cut residue into turbulent flow, which separates the cut residue. Once the cut residue has separated, the cut residue continues to turn and starts a discharge cycle at the first end 154a of the distribution deflector 154. The cut residue slides along the body 174 of the distribution deflector 154, with a gradual discharge occurring due to the slope of the body and the difference in the heights, H2, H3 along the length of the body 174 (FIG. 5). At the second end 154b of the distribution deflector 154, the opening 158 allows the remaining cut residue to be discharged from the full-distribution cutting chamber 22. The rear anti-turbulence deflector 156 prevents or inhibits turbulent flow of air back into the full-distribution cutting chamber 22 due to the position of the rear anti-turbulence deflector 156 at the angle γ, which is offset from the perpendicular position of the cutting blade assembly 32 or is offset from a center plane taken through the cutting blade assembly 32 as indicated by line CP. Generally, the perpendicular orientation or position of the cutting blade assembly 32 is substantially parallel to the longitudinal axis. Thus, the full-distribution cutting chamber 22 enables the discharge of cut residue evenly over the width W of the full-distribution cutting chamber 22, thereby substantially eliminating windrows and providing an aesthetically appeasing appearance of the field 14 (FIG. 1) after being cut.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A rotary cutting implement, comprising:
   a housing that extends along a longitudinal axis, the housing having an upper wall; and
   an annular wall coupled to the upper wall of the housing to define a cutting chamber having a cutting chamber radius and a width defined from a first sidewall to a second sidewall, the annular wall including a distribution deflector having a body that extends along an axis substantially transverse to the longitudinal axis to form the second sidewall of the cutting chamber, the axis of the distribution deflector forming an oblique angle with respect to the upper wall of the housing and changing the cutting chamber radius along a portion of the annular wall;
   wherein the distribution deflector is configured to gradually discharge cut residue from the cutting chamber, the distribution deflector having a height at a first end that is different from a height at a second end with a tapered edge continuously decreasing in height relative to the upper wall from the first end to the second end, the second end of the distribution deflector in part defining an opening through which a portion of the cut residue is discharged from the cutting chamber and the housing, the tapered edge permitting passage of another portion of the cut residue from within the cutting chamber prior to reaching the opening at the second end of the distribution deflector; and
   wherein the distribution deflector distributes cut residue over substantially the width of the cutting chamber.

2. The rotary cutting implement of claim 1, wherein the annular wall further comprises a sloped apron coupled to the distribution deflector and oriented at an oblique angle with respect to the upper wall of the housing.

3. The rotary cutting implement of claim 2, wherein the annular wall further comprises a front deflector coupled about the sloped apron.

4. The rotary cutting implement of claim 3, wherein the annular wall further comprises an intermediate portion coupled to the front deflector and the intermediate portion is the first sidewall;
   wherein the intermediate portion is substantially opposite at least a portion of the distribution deflector about a perimeter of the cutting chamber.

5. The rotary cutting implement of claim 4, wherein the annular wall further comprises an anti-turbulence deflector;
   wherein the anti-turbulence deflector is coupled to the intermediate portion and spaced apart from the distribution deflector by the opening.

6. The rotary cutting implement of claim 5, further comprising a cutting blade assembly received within the cutting chamber, wherein the anti-turbulence deflector is coupled to the intermediate portion and the housing such that an end of the anti-turbulence deflector is offset from a perpendicular orientation of the cutting blade within the cutting chamber, with the perpendicular orientation of the cutting blade assembly substantially parallel to the longitudinal axis.

7. The rotary cutting implement of claim 1, further comprising a second annular wall coupled to the cutting chamber so as to be positioned within a perimeter defined by the annular wall.

8. The rotary cutting implement of claim 1, wherein the cutting chamber defined by the annular wall is eccentric to the longitudinal axis.

9. A rotary cutting implement, comprising:
   a housing that extends along a longitudinal axis, the housing having an upper wall; and
   an annular wall coupled to the upper wall of the housing to define a cutting chamber having a cutting chamber radius and a width defined from a first sidewall to a second sidewall, the annular wall including a sloped apron coupled to a distribution deflector, the sloped apron defining a sloped area adjacent to the distribution deflector, the distribution deflector having a body that extends along an axis substantially transverse to the longitudinal axis to form the second sidewall of the cutting chamber, the axis of the distribution deflector forming an oblique angle with respect to the upper wall of the housing and changing the cutting chamber radius along a portion of the annular wall;

wherein the distribution deflector is configured to gradually discharge cut residue from the cutting chamber, the distribution deflector having a height at a first end that is different from a height at a second end with a tapered edge continuously decreasing in height relative to the upper wall from the first end to the second end, the second end of the distribution deflector in part defining an opening through which a portion of the cut residue is discharged from the cutting chamber and the housing, the tapered edge permitting passage of another portion of the cut residue from within the cutting chamber prior to reaching the opening at the second end of the distribution deflector; and wherein the distribution deflector distributes cut residue over the width of the cutting chamber.

10. The rotary cutting implement of claim 9, wherein the annular wall further comprises a front deflector coupled about the sloped apron.

11. The rotary cutting implement of claim 10, wherein the annular wall further comprises an intermediate portion coupled to the front deflector;

wherein the intermediate portion is substantially opposite at least a portion of the distribution deflector about a perimeter of the cutting chamber.

12. The rotary cutting implement of claim 11, wherein the annular wall further comprises an anti-turbulence deflector;

wherein the anti-turbulence deflector is coupled to the intermediate portion and spaced apart from the distribution deflector by the opening.

13. The rotary cutting implement of claim 12, further comprising a cutting blade assembly received within the cutting chamber, wherein the anti-turbulence deflector is coupled to the intermediate portion and the housing such that an end of the anti-turbulence deflector is offset from a perpendicular orientation of the cutting blade within the cutting chamber, with the perpendicular orientation of the cutting blade assembly substantially parallel to the longitudinal axis.

14. The rotary cutting implement of claim 9, wherein the cutting chamber defined by the annular wall is eccentric to the longitudinal axis.

15. A rotary cutting implement, comprising:

a housing that extends along a longitudinal axis, the housing having an upper wall; and an annular wall coupled to the upper wall of the housing to define a cutting chamber having a cutting chamber radius, the annular wall including a sloped apron coupled to a distribution deflector and an anti-turbulence deflector, the sloped apron defining a sloped area adjacent to the distribution deflector, the distribution deflector having a first end and a second end, with a height of the distribution deflector relative to the housing at the first end different than a height of the distribution deflector relative to the housing at the second end;

wherein the distribution deflector has a body that extends along an axis substantially transverse to the longitudinal axis to form the sidewall of the cutting chamber, the axis of the distribution deflector forming an oblique angle with respect to the upper wall of the housing and changing the cutting chamber radius along a portion of the annular wall;

wherein the distribution deflector is configured to gradually discharge cut residue from the cutting chamber and has a tapered edge continuously decreasing in height relative to the upper wall from the first end to the second end, the second end of the distribution deflector in part defining an opening through which a portion of the cut residue is discharged from the cutting chamber and the housing, the tapered edge permitting passage of another portion of the cut residue from within the cutting chamber prior to reaching the opening at the second end of the distribution deflector; and wherein the distribution deflector forms a sidewall of the cutting chamber and the anti-turbulence deflector is coupled to the housing such that the anti-turbulence deflector is spaced apart from the distribution deflector by the opening.

16. The rotary cutting implement of claim 15, wherein the annular wall further comprises a front deflector coupled about the sloped apron.

17. The rotary cutting implement of claim 15, further comprising a cutting blade assembly received within the cutting chamber, wherein the anti-turbulence deflector is coupled to the housing such that an end of the anti-turbulence deflector is offset from a perpendicular orientation of the cutting blade within the cutting chamber, with the perpendicular orientation of the cutting blade assembly substantially parallel to the longitudinal axis.

* * * * *